US012137781B2

(12) United States Patent
Adams

(10) Patent No.: US 12,137,781 B2
(45) Date of Patent: Nov. 12, 2024

(54) GLASSES HOLDER

(71) Applicant: James Adams, Mashpee, MA (US)

(72) Inventor: James Adams, Mashpee, MA (US)

( * ) Notice: Subject to any disclaimer, the term of this patent is extended or adjusted under 35 U.S.C. 154(b) by 249 days.

(21) Appl. No.: 17/876,998

(22) Filed: Jul. 29, 2022

(65) Prior Publication Data

US 2024/0032661 A1 Feb. 1, 2024

(51) Int. Cl.

*A45C 11/04* (2006.01)
*A45C 15/06* (2006.01)
*G08B 3/00* (2006.01)
*G08B 5/36* (2006.01)

(52) U.S. Cl.

CPC .............. *A45C 11/04* (2013.01); *A45C 15/06* (2013.01); *G08B 3/00* (2013.01); *G08B 5/36* (2013.01)

(58) Field of Classification Search

CPC ...................................................... A45C 11/04
See application file for complete search history.

(56) References Cited

U.S. PATENT DOCUMENTS 3,550,890 A 12/1970 Kemp
4,432,521 A 2/1984 Douglas
4,609,975 A 9/1986 Badolato
4,949,432 A 8/1990 Wisniewski
5,137,252 A 8/1992 Reath
5,188,322 A 2/1993 Kinstrey
6,039,173 A 3/2000 Crow
6,598,751 B2 7/2003 McNelis
7,188,739 B1 * 3/2007 Raile ...................... A45C 11/04 211/85.1
7,789,366 B2 9/2010 McDonald
8,985,320 B2 3/2015 Santarelli
9,181,023 B2 11/2015 Clinton
9,702,540 B2 7/2017 Naumann
9,743,494 B1 * 8/2017 McCrory ............... H05B 47/11
10,993,515 B1 5/2021 Kim
2003/0229971 A1 12/2003 Coyne
2005/0242771 A1 11/2005 Blum
2007/0242213 A1 10/2007 Grillo
2013/0194789 A1 8/2013 Vargas
2014/0061406 A1 3/2014 Chevalier
2018/0162640 A1 * 6/2018 Lee ........................ G06Q 10/08
2019/0173294 A1 6/2019 Paulson
2019/0272800 A1 9/2019 Tao
2020/0218093 A1 7/2020 Blum
2022/0114868 A1 * 4/2022 Bronicki .............. G06V 10/765

FOREIGN PATENT DOCUMENTS

CN 103767283 B 5/2015
CN 204831284 U 12/2015
CN 105559302 B 7/2018
JP 3102827 U 7/2004
WO 2010116226 A3 10/2010
WO 2021022994 2/2021

* cited by examiner

*Primary Examiner* — Travis R Hunnings
(74) *Attorney, Agent, or Firm* — Lambert Shortell & Connaughton; David J. Connaughton, Jr.; Justin P. Tinger

(57) ABSTRACT

A glasses holder is provided. The glasses holder comprises a body and a recess formed in the body into which glasses may be safely placed. The glasses holder provides a convenient place to safely store the glasses without risking scratching of the lenses. By providing a reliable and consistent place to store the glasses, the glasses holder also limits misplacing of the glasses.

7 Claims, 4 Drawing Sheets

GLASSES HOLDER

BACKGROUND

Technical Field

The present disclosure relates generally to storage devices. More particularly the present disclosure relates to a glasses storage device with functional features which provide habit-forming encouragements when glasses are placed in the storage device rather than elsewhere.

Description of Related Art

Eyeglasses, including vision-correcting glasses and sunglasses, are expensive and important accessories to allow for proper vision and protection from the sun. One substantial problem in the field of glasses use is that a wearer often removes the glasses for various reasons, places them on a surface, and forgets where they have been left. This can lead to the loss of expensive glasses. Furthermore, this can also lead to damaging of the glasses, particularly the lenses of the glasses. Wear and tear on lenses from being left on varied surfaces quickly leads to scratching of the lenses, making them harder to see through and obstructing vision and limiting vision correction. Accordingly, careless placement of glasses leads to their misplacement and damage.

Therefore, what is needed is a device that may safely and reliably store glasses, and in many cases induce habit-forming behaviors such as storing the glasses in a proper place.

SUMMARY

The subject matter of this application may involve, in some cases, interrelated products, alternative solutions to a particular problem, and/or a plurality of different uses of a single system or article.

In one aspect, a glasses storage device is provided. The glasses storage device has a body which provides its primary structure. The body defines a recess on a top surface of the body sized to receive a pair of glasses. The body further has a sensor configured to identify that the pair of glasses has been positioned in the recess. The sensor may then provide an output signal indicating that a pair of glasses is within the recess. The body further comprises a speaker which is in electronic communication with the sensor either directly or indirectly. The speaker is operable to emit a sound when a signal is received from the sensor, thereby causing the glasses storage device to make a sound confirming placement of the glasses in the device.

In another aspect, a system for glasses storage is provided. The system has a plurality of glasses storage devices. Each of the glasses storage devices has a body which provides its primary structure. The body defines a recess on a top surface of the body; the recess is sized to receive a pair of glasses. The body further has a sensor configured to indicate that the pair of glasses has been positioned in the recess. The sensor may then provide an output signal indicating that a pair of glasses is within the recess. Each of the plurality of glasses storage devices further has a network transmitter in communication, either direct or indirect, with the sensor. The system further has a computerized server. The server is in networked connection with each of the plurality of glasses storage devices. In turn, the sensor of each of the glasses storage devices is operable to provide a signal to the server via the network transmitter if a pair of glasses in positioned in the recess of that particular glasses storage device.

In yet another aspect, a method of storing glasses is provided. The method involves obtaining a glasses storage device. The glasses storage device has a body which provides its primary structure. The body defines a recess on a top surface of the body; the recess is sized to receive a pair of glasses. The body further has a sensor configured to identify that the pair of glasses has been positioned in the recess. The sensor may then provide an output signal indicating that a pair of glasses is within the recess. The body further comprises a speaker which is in electronic communication with the sensor either directly or indirectly. The speaker is operable to emit a sound when a signal is received from the sensor, thereby causing the glasses storage device to make a sound confirming placement of the glasses in the device. The method then involves placing a pair of glasses in the recess. This placement secures and protects the pair of glasses. Further, the placing of the glasses in the recess causes the sensor to activate the speaker to provide a sound. This sound confirms to the user that the glasses are properly positioned, and operates to psychologically reinforce that when a user puts the glasses down, he or she should hear the sound to confirm proper placement. Should the user place the glasses in a more dangerous place like a table or desk, no sound will be emitted, which may remind the user to place them in the glasses holder device instead.

DETAILED DESCRIPTION

Figure 1:
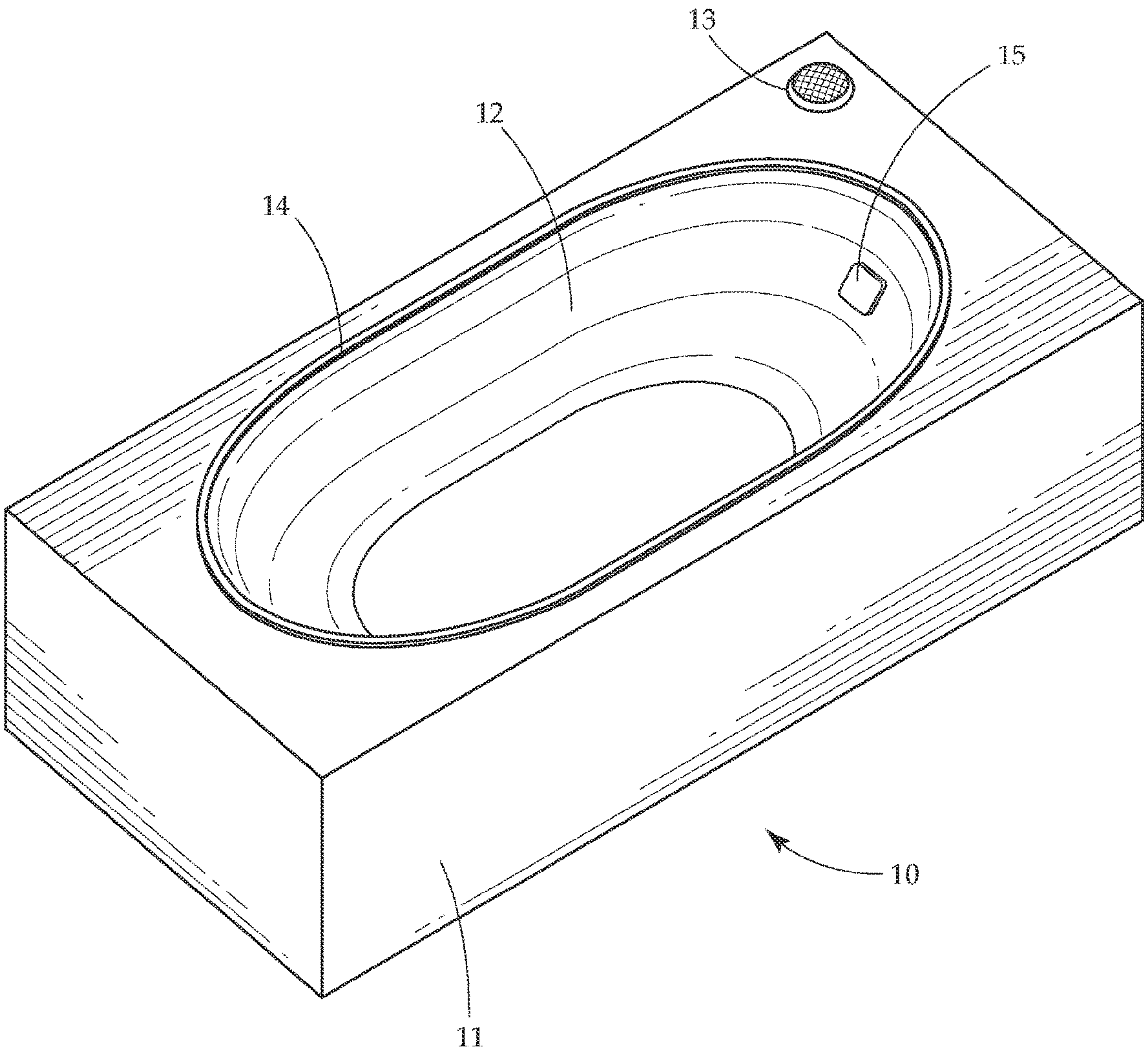
FIG. 1 provides a perspective view of an embodiment of the glasses holder.

The detailed description set forth below in connection with the appended drawings is intended as a description of presently preferred embodiments of the invention and does not represent the only forms in which the present disclosure may be constructed and/or utilized. The description sets forth the functions and the sequence of steps for constructing and operating the invention in connection with the illustrated embodiments.

Generally, the present disclosure concerns a glasses storage device. The device may be formed with a body having a recess or similar depression which allows for secure placement of glasses without damage to the glasses, particularly the lenses. Typically, the recess is on a top surface of the body, but not necessarily. In a most basic embodiment, the glasses storage device has the body with a rounded recess which allows for safe, easy placement of glasses. In typical embodiments, the device is designed so as to avoid all contact between device and lenses in order to protect and preserve the lenses of the glasses. The term recess is used herein to generally describe the storage area for the glasses, though it should be understood that other embodiments with structures able to safely store glasses may also be used without straying from the scope of this invention. The term recess is used herein for convenience but may also refer to other structures such as a rack, platform, surface, area, mound, and the like.

In further embodiments, additional features may be employed. For example, a light may be positioned on the body to illuminate glasses within the recess. In certain embodiments, the light may operate in concert with a sensor which detects the presence of glasses within the recess of the glasses holder and will activate or deactivate the light when glasses are present. In another embodiment, a speaker may be positioned on or in the body. The speaker may be operable to emit a pleasing and/or memorable sound when glasses are placed in or taken from the recess as identified by a sensor. In various embodiments, internal electronic components including but not limited to a battery, processor, memory, and/or wired or wireless network connections (port, transceiver, transmitter, and the like) may be on or in the body to allow for functionality of the device's electronic components.

The body may be formed of any material capable of providing a structure to support glasses within the recess. In many embodiments, the body may be formed of a material able to contain electronic components such as a speaker, lights, battery, processor, memory, transceiver, and the like. Typical non-limiting examples of the body material may include wood, plastics, metal, composite materials, and the like. In certain embodiments, the recess in the body for storing the glasses may be lined with a material such as a soft material or high friction material. These lining materials may include but are not limited to fabrics, plastics, rubber, foams, and the like.

The sensor disclosed herein may be any electronic, mechanical, or other sensor able to detect a presence of glasses within the recess. Sensors may include, but are not limited to, optical sensors, RFID or other proximity sensors, barcode reader, infrared sensors, weight sensors, impedance sensors, noise sensors, motion sensors, vibration sensors, and the like.

As is known in the art, many will pay top dollar for extra-hard lenses because a pair of glasses that are not often worn and left sitting on various surfaces are likely to get scratched. Alternatively, glasses wearers will get less-expensive softer lenses which then require more careful handling. Soft lenses have the added inconvenience of needing to place them in soft cases provided by the seller. Regardless of selection of hard or soft lenses, there is a need to make glasses last longer by protecting the lenses, allowing them to transmit light with optimum clarity over time.

The glasses holder of the present disclosure solves this problem by protecting the lenses of glasses, prolonging their life and ensuring that they remain scratch-free. This allows purchasers to choose less-expensive soft lenses. Many storage solutions of the prior art do not protect the lenses, and in fact involve contact with the lenses, leading to scratches and wear over time.

In further embodiments, the glasses storage device may have varied electronic components which improve functionality and add features to the device. In such embodiments, the glasses storage device has an energy source such as a battery, wired, or wireless electrical connection. In one embodiment, the glasses storage device may have a speaker which emits a pleasant sound such as a musical confirmation that the glasses are safe from scratching when placed in the recess of the device. The act of stowing followed by the sound of confirmation sets up a synchronicity that inculcates and reinforces in the user the habit of protecting the lenses from scratching and becoming soiled. In other words, a user is "trained" to protect the glasses, including the lenses, by placing the glasses down in the device and associating this action with the particular sound of the device. That way, if putting glasses down in an unsafe location such as a table or chair, the user expects to hear the noise, but does not. In this version, the musical module may be further programmed, at the discretion of the user, to emit a second sound when glasses are removed from the device. The second sound indicating removal may be the same or different from the sound indicating placement in the device. As noted throughout, the device has a sensor to detect the presence of the glasses in the recess, or lack thereof which communicates with electronic components such as the speaker and allows operation based on presence of the glasses in the recess or lack thereof.

In another embodiment, the device may have a light in addition to or instead of the speaker. In such an embodiment, the device may further promote the habit of protecting the lenses by illuminating an LED or other light source when the glasses are stowed. The device reinforces the habit of protecting the lenses by providing continuous assurance of the glasses' protected status as the internal light source remains illuminated while the glasses are being stored. In these embodiments the constantly illuminated light source also facilitates locating the stored glasses in situations where ambient light is low. In another embodiment, the light source may be active when glasses are not present in the recess.

In further embodiments, the glasses storage device may have a wireless transmitter/transceiver or other wireless or wired network connection. This configuration allows a sensor to provide information as to whether glasses are present in the recess to an external computing device such as a smartphone, smart hub (such as an Alexa®, Google® Home and the like), networked server, networked computer, and the like. In one example, a user may have three glasses storage devices, with one in three different rooms. Each glasses storage device may be connected to a wireless internet connection. When seeking to determine the location of a pair of glasses, the user may use a smartphone, laptop, or other computer to query each glasses storage device to ascertain whether any of them has a pair of glasses in the recess as identified by the sensor. This query may be done through manipulation of a computer user interface, by voice commands using the computer or smart hub, and the like. In another embodiment, a user may use a smart hub such as Alexa to connect to each device, and can use a verbal query such as "where are my glasses." In still another embodiment, after a query is received by the glasses storage device network connection, a light and/or speaker of the glasses holder device may be programmed to emit a sound or light to signify the presence of glasses in the recess.

In a particular embodiment, a pair of glasses may be equipped with a tag, such as an RFID tag, magnetic tag, barcode/QR code, fluorescent marking, and the like. In such an embodiment, the glasses storage device may have a sensor which can identify the tag and the device may be programmed to only operate in connection with the pair of glasses having the tag on or in it. In a particular further embodiment, the glasses storage device may be marketed and sold in combination with the glasses as a marketing tool. Of course, other advantages to a paired operation of the glasses storage device to a particular pair of glasses exist, including enhanced tracking and location ability, among other features.

Figure 2:
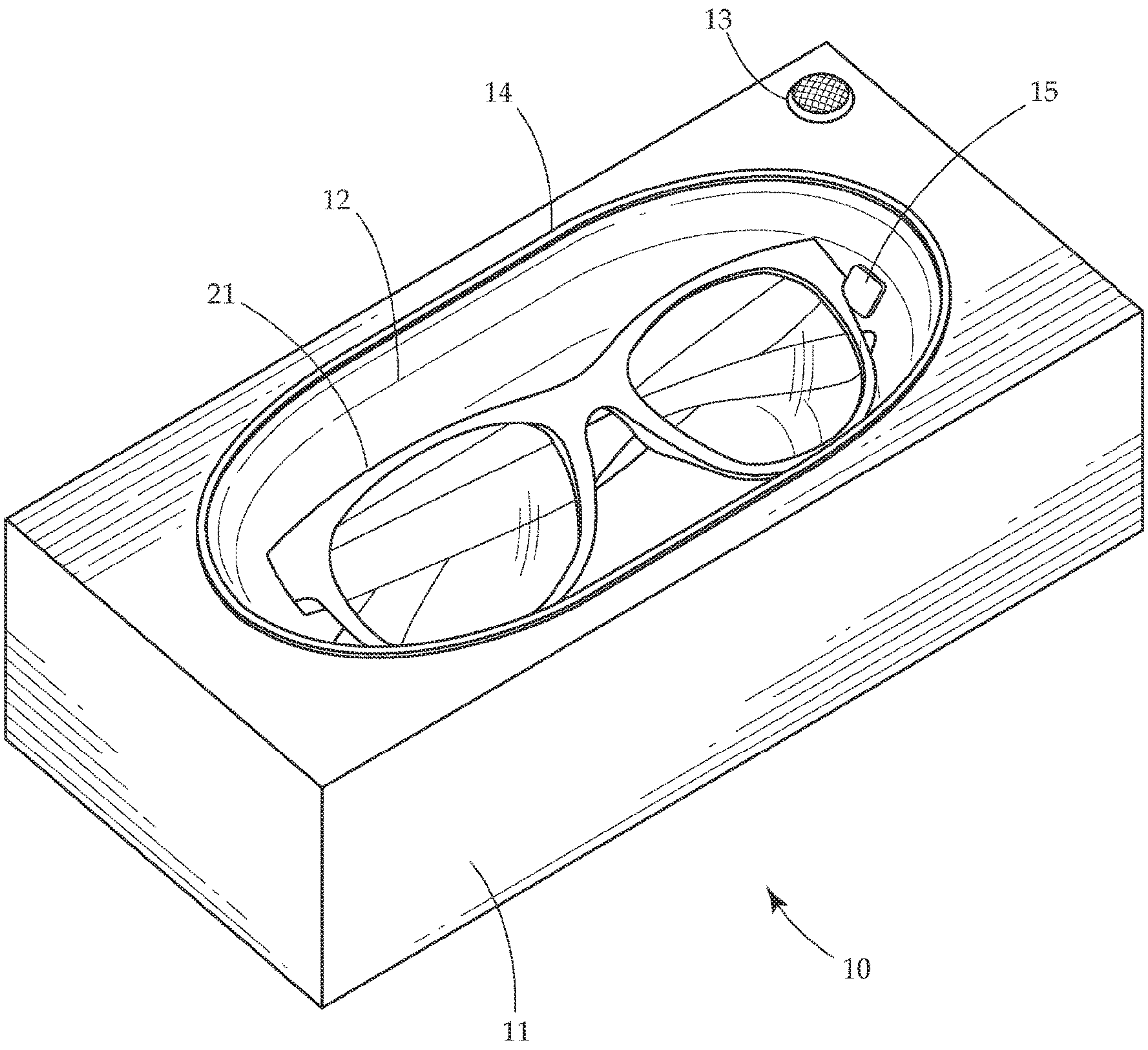
FIG. 2 provides a perspective view of another embodiment of the glasses holder.

Turning now to FIGS. 1 and 2 a perspective view of an embodiment of the present disclosure is provided. In this view, a "smart" glasses storage device 10 is shown. The glasses storage device 10 has a body 11 which provides a structure and base for internal components and features. A recess 12 is formed into the top of the body 11 and extends downwardly into the body forming an area to receive a pair of glasses. The glasses 21 may rest in the recess 12 and be protected and safely stored therein. A sensor 15 is in communication with the recess and can detect that a pair of glasses 21 has been set in the recess 12. As noted above, the sensor may be any sensor capable of detecting the presence of the glasses 21, such as an optical, infrared, weight sensor, induction sensor, electromagnetic sensor and the like. The sensor 15 is in communication with a speaker 13 and upon placement and/or removal of the glasses 21 from the recess 12, the speaker 13 emits a pleasing and reminder-creating sound. In a further embodiment, the speaker 13 may be operable to emit a sound upon receipt of a signal by a transceiver (not shown) of the glasses storage device 10. For example, a computer may request a location of the glasses 21, and if glasses are present in the recess 12 as determined by the sensor 15, the speaker 13 may be programmed to "ping" or otherwise make a sound indicating the presence of the glasses 21 in the recess 12.

Further, a ring of lighting 14 such as LED or other similar lights extends around the perimeter of the recess 12. Of course, lights may vary in location and configuration. In one embodiment of operation, the light may be activated when the glasses 21 are in the recess based on a signal from the sensor 15 which is in communication with the lighting 14. In another embodiment of operation, the light may be activated when the glasses 21 are not in the recess based on a signal from the sensor 15 which is in communication with the lighting 14. In a further embodiment, the lighting 14 may be operable to emit light or pulse or different color light upon receipt of a signal by a transceiver or other networked connection (not shown) of the glasses storage device 10. For example, a computer may request a location of the glasses 21, and if present in the recess 12 as determined by the sensor 15, the lighting 14 may be programmed to actuate, flash, change color, pulse, or otherwise emit light indicating the presence of the glasses 21 in the recess 12.

Figure 3:
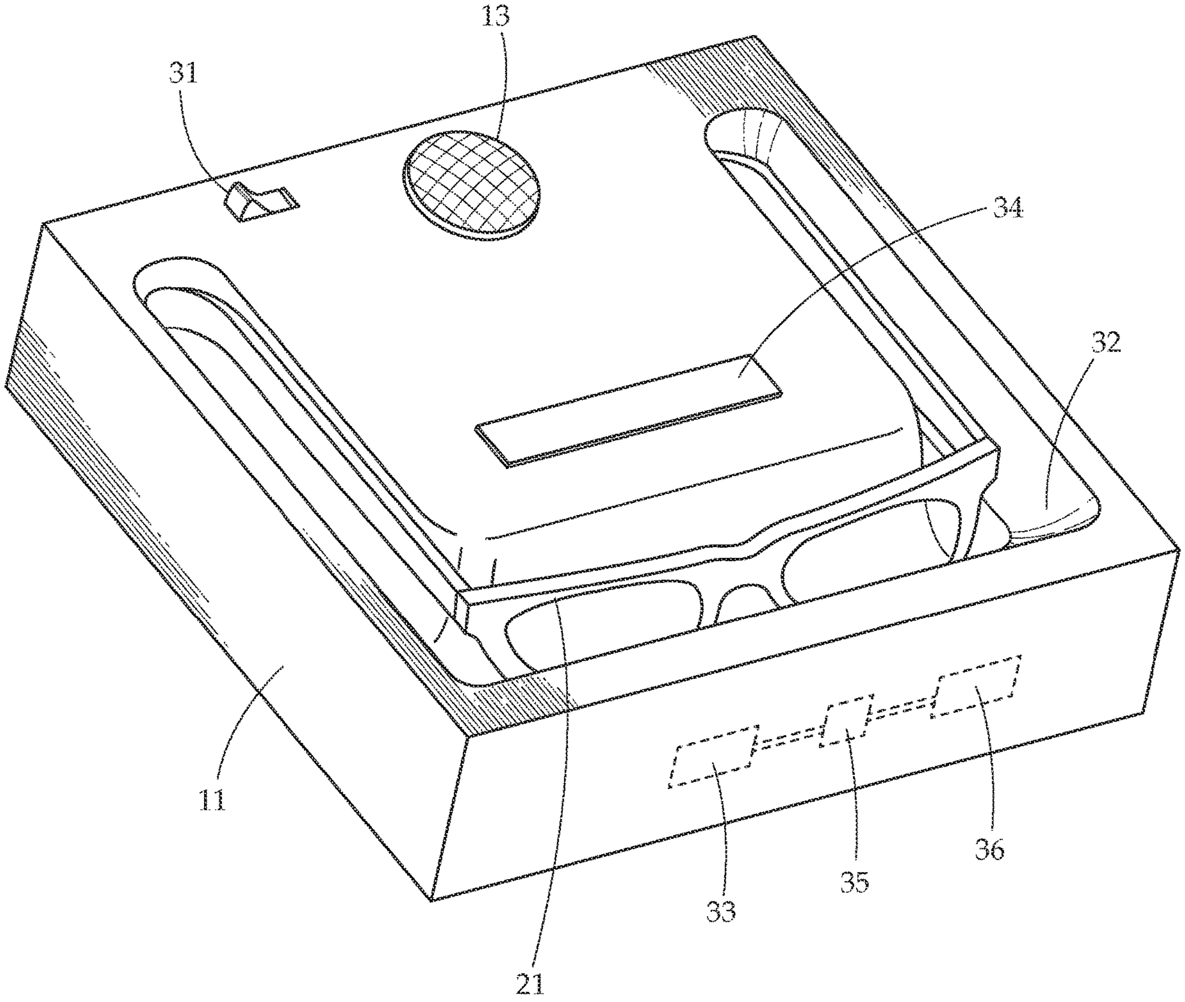
FIG. 3 provides a perspective view of still another embodiment of the glasses holder.

FIG. 3 shows another embodiment of the glasses holder of the present disclosure. In this view, another "smart" glasses holder is shown having electronic components to improve functionality. The glasses holder has a body 11 which defines a U-shaped recess 32. The U shape of the recess 32 allows glasses 21 to be placed into the device in an "open" position with the glasses arms (sometimes referred to as "temples") extended outward in a normal wearing position without being folded. In this embodiment, a speaker 13 is shown, as is a light 34 which in this view is positioned centrally on the top of the body 11 but of course may be placed anywhere on the body 11. In this figure, internal electronic components can be seen, including a battery 33 which provides electrical power to the speaker, sensor, light and any other components. A processor 35 controls functional operation of components and communication, such as actuation of the speaker and/or light when the sensor detects the presence of the glasses. Processor 35 is in communication with battery 33. A memory 36 is in communication with the processor and comprises program instructions to control operation of the processor 35 and in turn other components.

Figure 4:
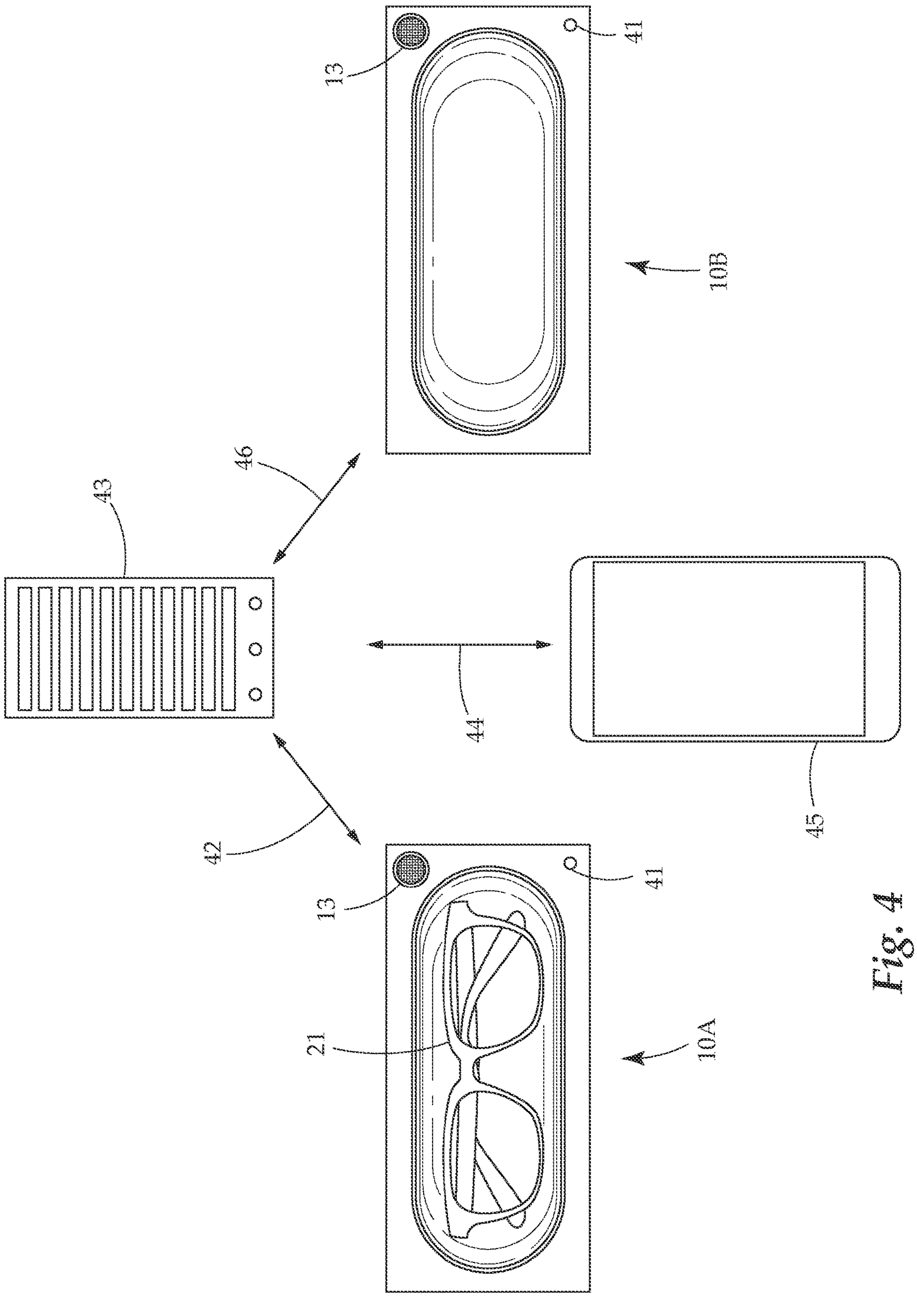
FIG. 4 provides a schematic view of an embodiment of a system having an embodiment of the glasses holder in networked communication with a server.

FIG. 4 shows a system comprising a plurality of glasses holder devices in networked connection with a server or similar networked computer. In this view, two glasses holder devices are shown, 10A and 10B. Each glasses holder has a wireless transceiver 41 which is in wireless networked communication with server 43 via networked paths 42 and 46. The wireless transceiver 41 of each glasses holder device is in communication with a sensor which can identify the presence or lack of glasses in the recess. This information can be sent to server 43 via signal paths 42, 46. A user computer 45, shown here as a smartphone, is in communication with the server 43 via data path 44. The user computer 45 is operable to query the server 43 regarding a status of each glasses storage device 10A, 10B. Depending on embodiment, transceiver may send a signal periodically, continuously, upon any sensor change, and/or upon receipt of a query from the server 43 and/or user computer 45. In one embodiment, information signifying if a pair of glasses in present in any of the recesses of glasses storage device 10A, 10B can be sent back to the user computer 45 and displayed on a user interface.

In another embodiment, upon a query from the user computer 45 the transceiver 41 may receive a signal from the server 43, and may be programmed to emit a sound from speaker 13, flash a light, or other similar identification action and combinations thereof. In other similar embodiments also contemplated by this disclosure, the glasses storage devices may be in wireless connection with the user computer 45 directly, such as by a Bluetooth® wireless connection. In the embodiment shown, the glasses 21 are positioned in glasses storage device 10A. In such an embodiment, the user computer may provide information on a screen showing which device is holding the glasses, and/or the speaker 13 of the device 10A may be made to emit a ping or similar identification noise. In a further embodiment having a second pair of glasses in a second glasses holder device 10B, both devices 10A and 10B may indicate the presence of glasses. In still a further embodiment, the device 10A having the glasses 21 may provide location information to the user computer 45 to aid in locating the glasses and device.

While several variations of the present disclosure have been illustrated by way of example in preferred or particular embodiments, it is apparent that further embodiments could be developed within the spirit and scope of the present disclosure, or the inventive concept thereof. However, it is to be expressly understood that such modifications and adaptations are within the spirit and scope of the present disclosure, and are inclusive, but not limited to the following appended claims as set forth.

What is claimed is:

1. A system for glasses storage comprising:

a plurality of glasses storage devices, each glasses storage device comprising:

a body, the body defining a recess on a top surface of the body, the recess sized to receive a pair of glasses;

the body further comprising a sensor configured to identify that the pair of glasses has been positioned in the recess; and a network transmitter, the sensor in communication with the network transmitter;

the system further comprising a computerized server, the server in networked connection with each of the plurality of glasses storage devices, the sensor of each of the glasses storage devices operable to provide a signal to the server if a pair of glasses in positioned in the recess.

2. The system of claim 1 further comprising a pair of glasses in one of the plurality of glasses holders, the sensor of the one of the plurality of glasses holders sending a signal to the server to identify that the pair of glasses are in the recess of the one of the plurality of glasses holders.

3. The system of claim 2 further comprising a second pair of glasses in a second of the plurality of glasses holders, the sensor of the second of the plurality of glasses holders sending a signal to the server to identify that the second pair of glasses are in the recess of the second of the plurality of glasses holders.

4. The system of claim 2 wherein the server is operable to send a location information of the pair of glasses to a user computer.

5. The system of claim 2 wherein each of the plurality of glasses holders comprises a speaker, the sensor operable to cause the speaker to emit a sound when the sensor detects placement of the pair of glasses within the recess.

6. The system of claim 2 wherein each of the plurality of glasses holders comprises a light, the sensor operable to cause the light to activate when the sensor detects placement of the pair of glasses within the recess.

7. The system of claim 1 wherein the network transmitter is a wireless transmitter.

* * * * *